United States Patent
Kundu et al.

(10) Patent No.: US 12,517,832 B1
(45) Date of Patent: Jan. 6, 2026

(54) SYSTEM AND METHOD TO MANAGE CACHE SIZE FOR BURSTY CONCURRENT APPLICATION TRANSACTIONS USING DYNAMICALLY ADJUSTABLE PRIMARY AND SECONDARY CACHE SIZE LIMITS

(71) Applicant: Pegasystems Inc., Cambridge, MA (US)

(72) Inventors: Bishwendu Kundu, Telangana (IN); Stuti Bhushan, Karnataka (IN); Janardhan Prodduturi, Telangana (IN)

(73) Assignee: Pegasystems Inc., Cambridge, MA (US)

( * ) Notice: Subject to any disclaimer, the term of this patent is extended or adjusted under 35 U.S.C. 154(b) by 0 days.

(21) Appl. No.: 18/586,225

(22) Filed: Feb. 23, 2024

(51) Int. Cl.
G06F 12/0871 (2016.01)
G06F 12/0891 (2016.01)

(52) U.S. Cl.
CPC ...... *G06F 12/0871* (2013.01); *G06F 12/0891* (2013.01)

(58) Field of Classification Search
CPC .................. G06F 12/0871; G06F 12/0891
See application file for complete search history.

(56) References Cited

U.S. PATENT DOCUMENTS

| | | | | |
|---|---|---|---|---|
| 5,566,315 A | * | 10/1996 | Milillo | G06F 12/0866 711/E12.07 |
| 10,423,507 B1 | * | 9/2019 | Panghal | G06F 3/0683 |
| 2002/0133491 A1 | * | 9/2002 | Sim | G06F 16/10 |
| 2006/0064545 A1 | * | 3/2006 | Wintergerst | G06F 12/084 711/130 |
| 2006/0156048 A1 | * | 7/2006 | Hines | G06F 1/3203 713/320 |
| 2016/0077761 A1 | * | 3/2016 | Stabrawa | G06F 3/0604 711/172 |
| 2019/0361626 A1 | * | 11/2019 | East | G06F 3/0629 |
| 2023/0195622 A1 | * | 6/2023 | Vavilapalli | G06F 12/0802 711/118 |

* cited by examiner

*Primary Examiner* — Aracelis Ruiz
(74) *Attorney, Agent, or Firm* — PATENT LAW WORKS LLP

(57) ABSTRACT

A cache management system implements a primary cache limit and an extended cache size limit. A first cache policy is implemented for the cache size being between the primary cache limit and the extended cache limit. A second cache policy is implemented for the cache size being above the extended cache limit. The second cache policy is stricter than the first cache policy. In some implementations, the primary cache limit and the secondary cache limit are adapted up or down depending on Cache Miss ratio heuristics.

15 Claims, 7 Drawing Sheets

SYSTEM AND METHOD TO MANAGE CACHE SIZE FOR BURSTY CONCURRENT APPLICATION TRANSACTIONS USING DYNAMICALLY ADJUSTABLE PRIMARY AND SECONDARY CACHE SIZE LIMITS

TECHNICAL FIELD

The present disclosure is related to cache technologies to handle concurrent transactions of application, such as cloud-based caches.

BACKGROUND

Cloud-based caching technologies are increasingly being used to support computer applications. Computer program caches are used for storing frequently accessed or expensive-to-create objects in memory. Caches eliminate the need to repeatedly create and load information within a program. Caches retrieve content faster and reduce the load on application servers.

However, when the rate of generation of objects being added to a cache is too high, the size of the cache increases rapidly leading to out of memory errors and a performance penalty. To avoid this, an eviction strategy is typically used to keep the size of cache in check. However, conventional eviction strategies have various drawbacks and problems.

Some types of computer programs have repeated patterns of sudden bursts that happen frequently. Cloud-based caches can help but there are a variety of problems with conventional eviction strategies for the scenario of sudden and frequent bursts in terms of providing reliable performance with low overhead. For example, many advanced eviction strategies require dividing the cache memory into one or more segments resulting in costly implementations and high maintenance. Also, most of the conventional cache eviction strategies require blocking all operations (like GET or PUT) to the cache, to ensure that objects are evicted from the cache and the cache is not allowed to grow indefinitely.

In the case of burst scenarios, cache sizes can increase exponentially and hence the conventional approach of using one cache limit creates problems. As such bursts happen frequently, this can result in starting the eviction policy many times to keep the size of cache in check. Also, eviction policies are normally executed by blocking all the operations on the cache. Once the cache size is below the limit, then operations are re-allowed. But this strategy can have a negative impact on the throughput of the operations to the cache. Some of the problems with conventional cache design and operation results in memory overflow issues in the software system that can have a negative impact on the performance of applications having concurrent transactions.

SUMMARY

A system and method are disclosed to manage cache size for bursty concurrent application transactions using dynamically adjustable primary and secondary cache size limits. In one implementation, a cache management system implements a primary cache limit and an extended cache size limit. A first cache policy is implemented for the cache size being between the primary cache limit and the extended cache limit. A second cache policy is implemented for the cache size being above the extended cache limit. The second cache policy is stricter than the first cache policy. In some implementations, the primary cache limit and the secondary cache limit are adapted up or down depending on cache miss ratio heuristics.

An example method of cache management for an application cache, includes selecting a first cache size limit and a second cache size limit, wherein the second cache size limit is greater than the first cache size limit. The first cache size limit is a primary cache size limit and the second cache size limit is an extended cache size limit. In response to the cache size being between the first cache size limit and the second cache size limit, the method includes implementing a first cache eviction policy. In response to the cache size being greater than the second cache size limit, the method includes implementing a second cache eviction policy that is stricter than the first cache eviction policy.

In one implementation, the method includes: in response to the cache size being between the first cache size limit and the second cache size limit, permitting GET and PUT operations.

In one implementation, the method includes: in response to the cache size being greater than the second cache size limit, permitting concurrent GET operations.

In one implementation, the method includes: the first cache eviction policy having a first pruning percentage for evicting cache entries.

In one implementation, the method includes: identifying cache entries with a last access falling below the first pruning percentage.

In one implementation, the method includes: the second cache eviction policy having a second pruning percentage for evicting cache entries, the second pruning percentage being greater than the first pruning percentage.

In one implementation, the method includes identifying cache entries with a last access falling below the pruning percentage.

In one implementation, the method further includes: monitoring a cache miss ratio and in response adjusting the first cache size limit and the second cache size limit.

In one implementation, the method includes: if the response to the cache miss ratio being below a pre-selected threshold cache miss ratio threshold value, adjusting down the first cache size limit and the second cache size limit.

In one implementation, the method includes: the first cache size limit and the second cache limit are adjusted down by a step value.

In one implementation, the method includes: if the response to the cache miss ratio being above a pre-selected cache miss ratio threshold value, adjusting up the primary cache size limit and the secondary extended cache size limit.

In one implementation, the method includes the first cache size limit and the second cache limit are adjusted up by a step value.

DETAILED DESCRIPTION

Figure 1:
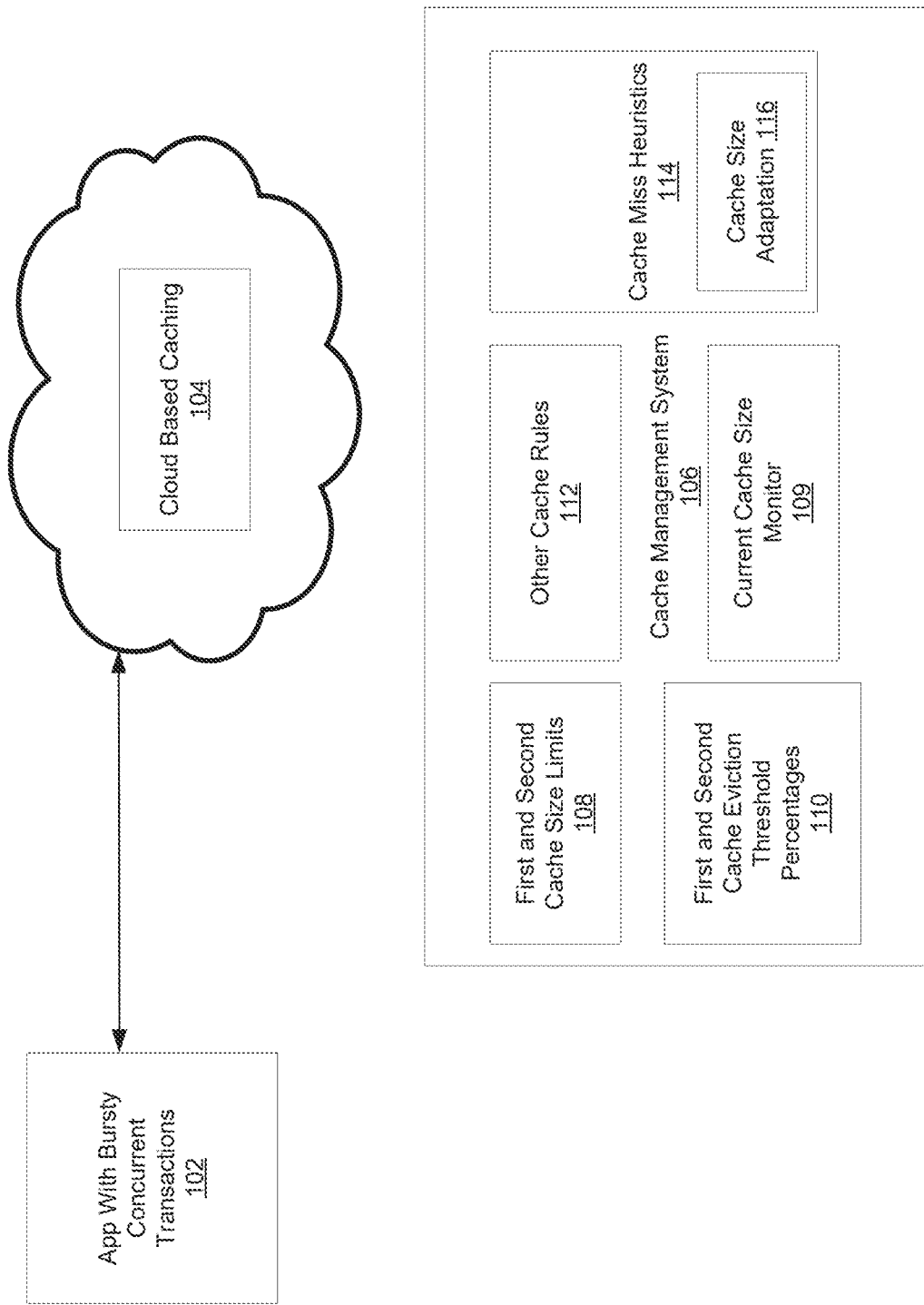
FIG. 1 is a block diagram of a cache management system in accordance with an implementation.

FIG. 1 illustrates an example of a cloud-based cache 104 to providing caching for an app 102 having concurrent transactions. To address the problems with conventional caches handling bursts of concurrent traffic, in one implementation a cache management system 106 employs two different cache size limits 108. Other changes to cache operation are also provided to optimize performance. These include first and second cache eviction threshold percentages 110, cache miss heuristics 114, cache size adaptation 116, and other cache rules 112. There is also a cache size monitor 109 monitoring the current cache size.

In one implementation, the cache is based on concurrent map available in most programming languages in different forms. The concurrent map approach guarantees memory consistency on key/value in a multithreading environment. This allows for easy implementation of operations like GET and PUT in a concurrent environment and helps support concurrent operations from multiple threads at any instant in time. In some application environments, in scenarios of frequent bursts of traffic, concurrent maps could grow very fast if left unchecked without limit in size.

One modification of a conventional cache is that there are two cache size limits. A first cache size limit is the Configured Size Limit. This is the primary limit on the size of the cache. In one implementation, best efforts are made to ordinarily keep the size of the cache within this limit. A second cache limit is an Extended Size Limit. This Extended Size Limit may, for example, be a multiple of the Configured Size Limit. The Extended Size Limit is the secondary limit on the size of the cache. So even if the primary Configured Size Limit is breached, the cache still allows operations to continue. But at the same time a first eviction strategy is also triggered, while the cache continues to grow towards this secondary limit. This allows for some breathing space for the eviction to run and operations to continue without any impact on the throughput. However, if the second cache size is exceeded, a stricter eviction policy is implemented. Also, additional cache rules may be applied.

In percentile-based eviction strategy, a calculation is performed of the new lower percentile threshold in terms of last accessed for all entries in the cache, at an instant in time. Then it is simply a matter of iterating through the cache and evicting items which have a last accessed time less than the percentile threshold.

Additionally, the cache implements a Cache Miss heuristic 114 to dynamically adjust the cache size limits based on the cache miss ratio, allowing for optimization of cache performance in real-time. Thus, for example, the cache sizes may be adapted based on the actual bursty traffic to optimize overall performance.

Figure 2:
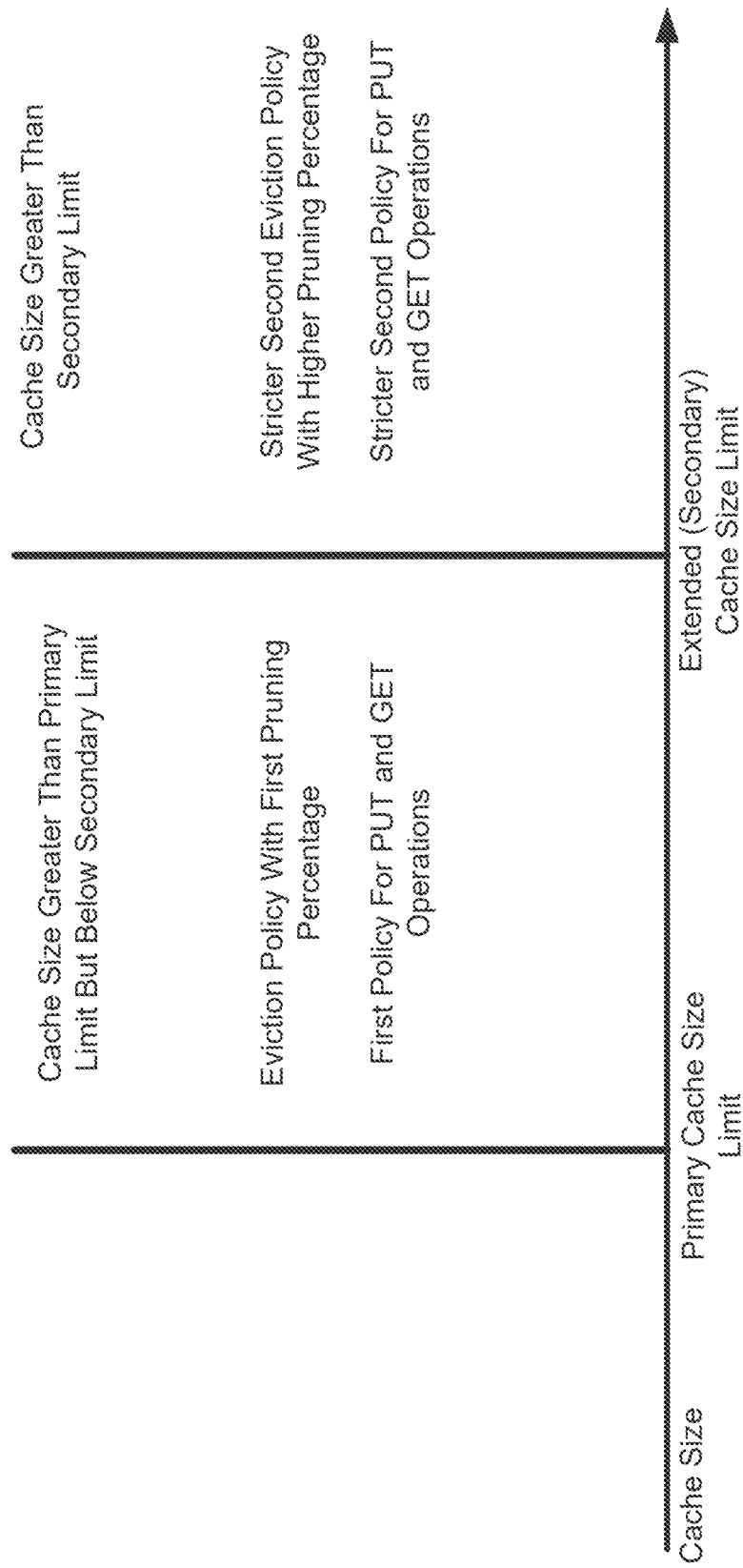
FIG. 2 is a simplified diagram illustrating two different cache size limits in accordance with an implementation.

FIG. 2 visually illustrates two different cache size limits with two different eviction rules. There is a first regime for when the cache size is between the primary cache size limit and the extended cache size limit. There is a second regime when the cache size is at or above the extended cache size limit. There is more aggressive pruning in the eviction policy when the secondary Cache Size Limit is reached.

There is also a more restrictive policy for some types of operations, such as PUT operations.

An example eviction strategy will now be described. As the cache has been designed to have two size limits suppose as an example when the cache size breaches the primary limit, we prune at most 40% of the entries and if the size breaches the secondary limit, we prune at most 60% of the entries. Both these percentages are configurable. The main point is that a stricter eviction policy is implemented if the secondary limit is breached.

In accordance with the present invention, a cache management system is provided that operates as follows:

Step 1: When the Cache size is greater than primary limit and smaller than secondary limit the following actions take place:

1. When the cache size exceeds the primary limit and is below the secondary limit, GET and PUT operations may be executed simultaneously without interruption.
2. However, a single PUT operation will be suspended to implement the eviction policy on the cache.
3. The eviction policy is utilized to determine the number of items to remove from the cache based on the current cache size and the pre-determined pruning percentage for this scenario. In one implementation, the pruning percentage is initially set at approximately 40%.
4. In one implementation, the eviction policy initially employs the 40th percentile of the last accessed times of items in the cache at the given moment to identify items with last access falling below the 40th percentile for removal.

Note that the items which are getting added to the cache, while the eviction policy is running are considered new and are not eligible for eviction policy run.

Step 2: When the cache size exceeds the secondary limit, the following actions will take place:

1. PUT operations to the cache end up not adding new objects to cache, i.e., the cache stops accepting new objects.
2. GET operations are still permitted to occur simultaneously without interruption.
3. However, a single PUT operation will be suspended to implement the eviction policy on the cache.
4. The eviction policy is implemented in order to remove a pre-determined percentage, in one implementation, initially approximately 60% of items from the cache.
5. If the cache miss ratio is determined to be low, and the secondary limit is exceeded, the primary and secondary limits may be adjusted downward by a fixed amount.
6. This system helps to prevent the cache from growing indefinitely in high-frequency burst scenarios, thereby avoiding potential out-of-memory issues.

This helps ensure that the cache size is not allowed to grow indefinitely in frequent burst scenarios and hence helps avoid any out of memory issues.

Examples of Cache Miss Heuristics will now be described. In one implementation, the Cache Miss Heuristics 114 monitor cache miss ratio and adjust cache size/limits accordingly as follows:

1. If the cache miss ratio is found to be low (e.g., below a preselected threshold ratio), the primary and secondary cache size limits may be adjusted downward by a fixed amount.
2. On the other hand, if the cache miss ratio is determined to be high (e.g., above a preselected threshold ratio), the primary and secondary cache size limits may be increased by a fixed amount.

3. It should be noted that these limits cannot be adjusted beyond a minimum and maximum threshold due to practical limitations. There is thus a permitted range which depends on the particular implementation details. It should also be noted that the Cache Miss heuristics may monitor a current cache miss ratio but more generally may process the cache miss ratio, such as performing a filtering operation, such as a time averaging over a selected window size.

In one implementation, the cache miss threshold for an application can be configured by system developers through experimentation and testing with application-specific traffic patterns. This value can be implemented to be adjustable to optimize cache performance in the specific context of the application.

Example Flowchart and Benchmark Tests

Figure 3:
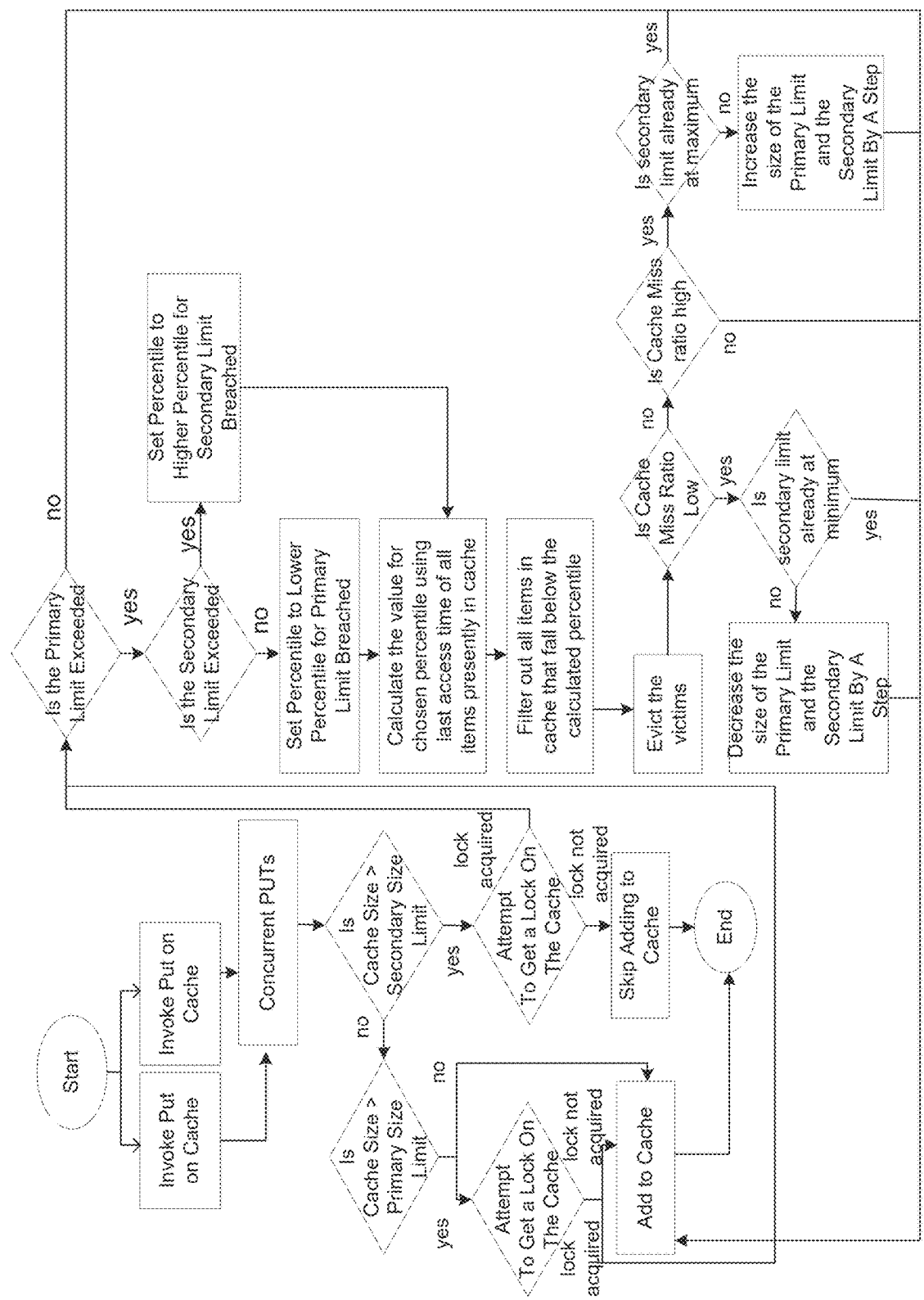
FIG. 3 is a flow chart illustrating an example method for adapting cache size limits in accordance with an implementation.

FIG. 3 illustrates an example flowchart of the eviction policy in action in accordance with an implementation. The flow chart of FIG. 3 provides an example of how when concurrent PUT transactions are received, various decisions are made based on whether the primary or secondary cache limit is exceeded.

FIG. 3 illustrates a flow chart showing an example of addressing the different regimes of cache size. In percentile-based eviction strategy, the eviction policy tries to calculate the configured percentile (e.g., 40th percentile) of all the given access times for all the items in the cache at that instant of time. In one implementation, the configured percentile is evaluated as follows:

1. 40th percentile (configurable) if the size of the cache is greater than the primary size limit and is below the secondary size limit of the cache.
2. 60th percentile (configurable) if size of cache is greater than secondary size limit of the cache.

Once, this percentile is calculated, the eviction policy goes about selecting victims whose access time falls below the newly calculated percentile. These victims are then deleted from the cache, freeing up more space to accommodate new items and prevent overflow.

For the deleting of the victims, in one implementation these are iterated in the cache and checked if their access time has changed due to recent access, they are skipped in regard to deletion.

In one implementation, the percentile calculation is a fast operation based on algorithm provided by the Guava java library.

Experimental tests were performed of the eviction technique, which fares well in highly concurrent systems. Test run results with 32 Threads, concurrent runs on the Java benchmark JMH.

Figure 4:
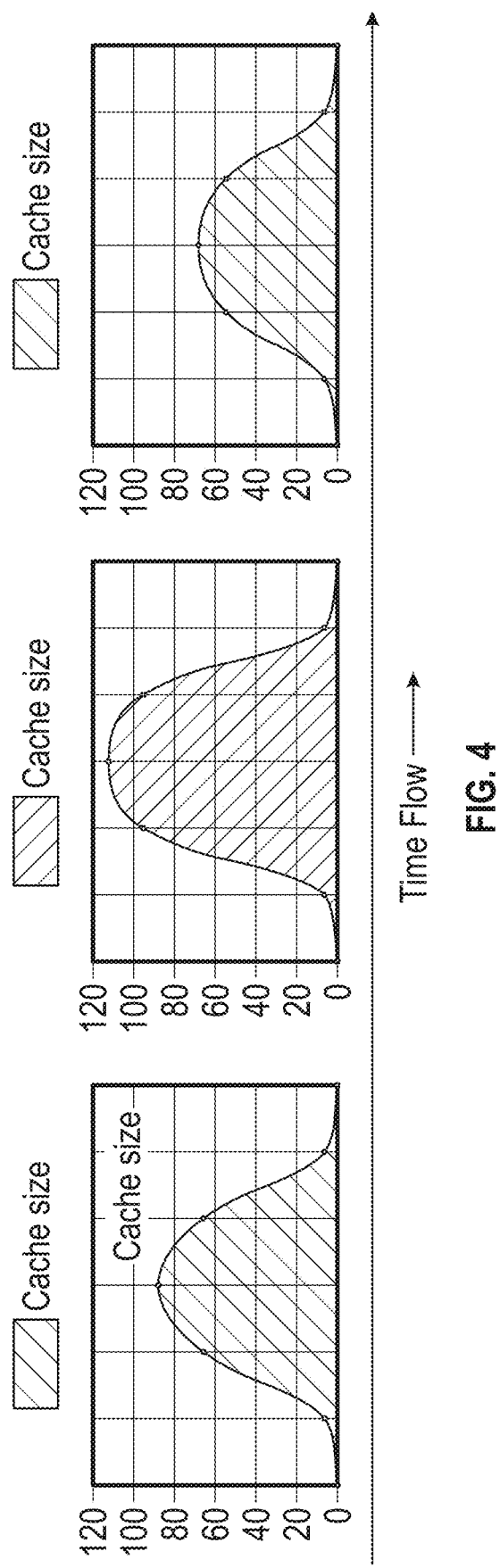
FIG. 4 illustrates an example of cache operation for cache size limits between the primary and secondary cache limits in accordance with an implementation.

FIG. 4 illustrates aspect of eviction at the primary limit showing an example of cache size versus a flow of time.

Figure 5:
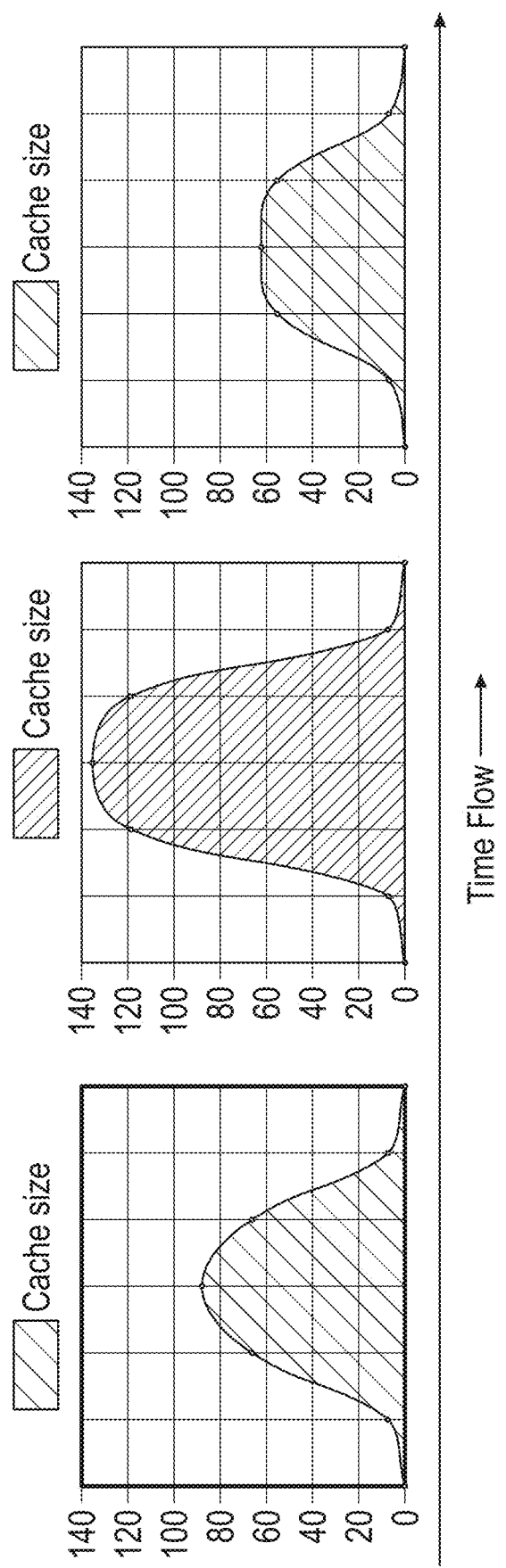
FIG. 5 illustrates an example of cache operation for cache size limits exceeding the secondary cache limits in accordance with an implementation.

FIG. 5 illustrates eviction at the secondary limit showing the cache size versus the flow of time.

Comparing FIG. 4 against FIG. 5, FIG. 5 illustrates a center panel in which the cache size has exceeded the secondary limit whereas in FIG. 4, the center panel illustrates the situation in which the cache size is between the primary and secondary size limits.

Figure 6:
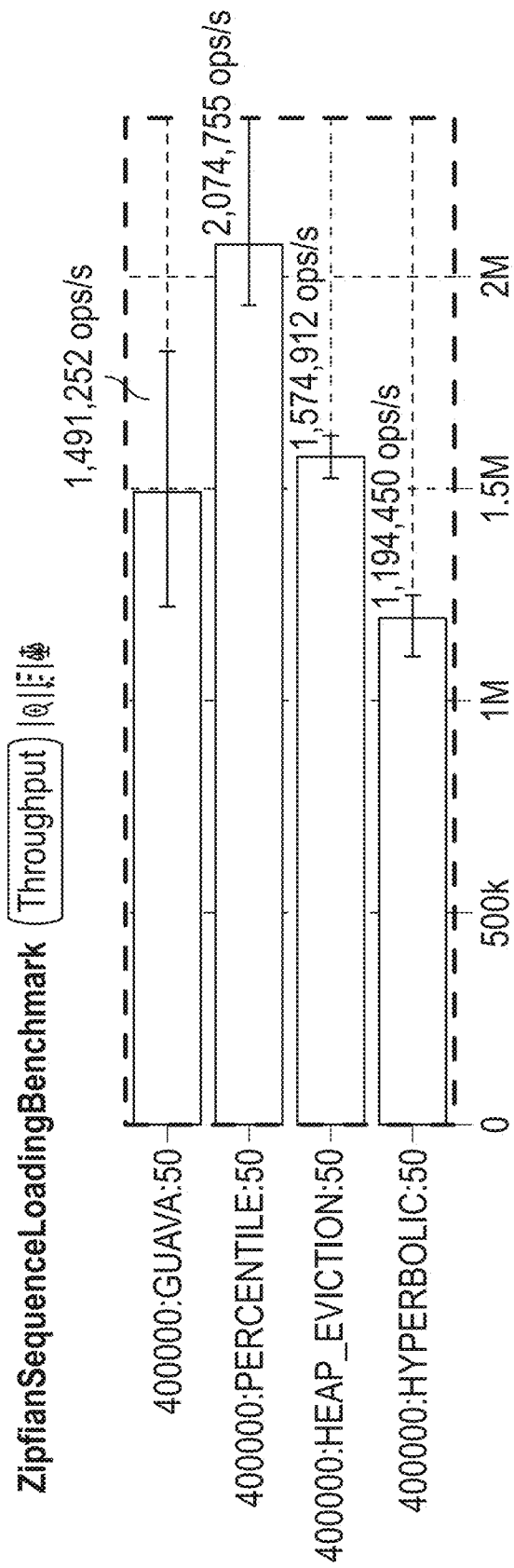
FIG. 6 illustrates a first example of a benchmark test in accordance with an implementation.
Figure 7:
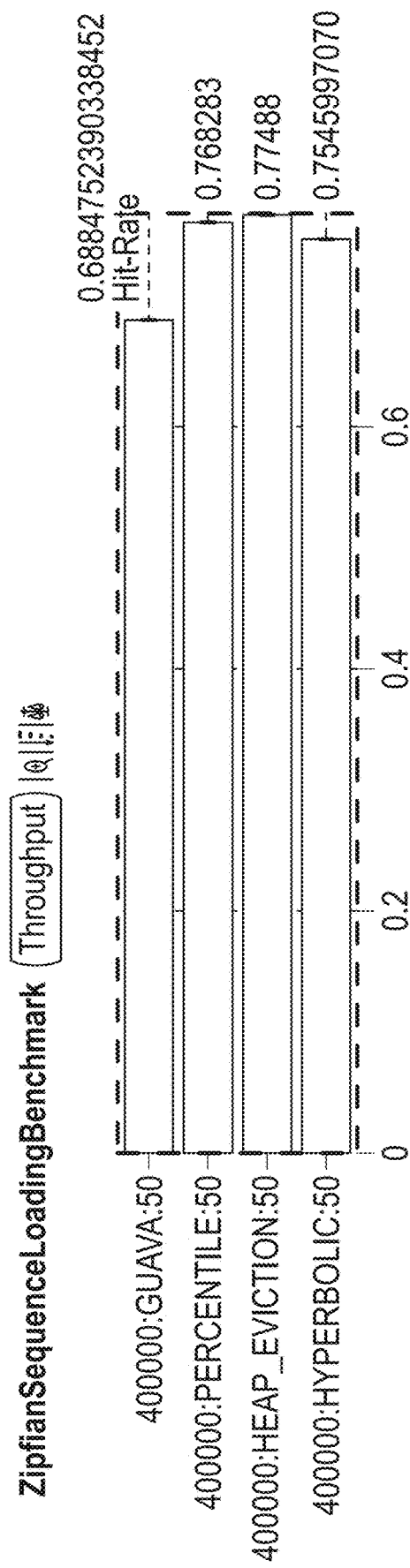
FIG. 7 illustrates a second example of a benchmark test in accordance with an implementation.

FIG. 6 illustrates an example of a benchmark test for throughput based on the rate of GET and PUT operations that the cache can support. FIG. 7 shows the Hit-Rate, which is the rate at which frequently accessed items are found in cache.

It will be understood that the cache management system may be implemented as software stored on a computer or server memory and executable on a processor. However, more generally it may be implemented in a variety of hardware and software implementations.

In the above description, for purposes of explanation, numerous specific details are set forth in order to provide a thorough understanding of the present disclosure. However, it should be understood that the technology described herein can be practiced without these specific details. Further, various systems, devices, and structures are not shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method, comprising:
    performing caching, using a cloud-based cache, for an application having bursty concurrent transactions from multiple threads;
    managing the cloud-based cache via a cache management system having a primary cache size limit and an extended cache size limit, wherein the extended cache size limit is greater than the primary cache size limit;
    in response to a cache size of the cloud-based cache being between the primary cache size limit and the extended cache size limit, implementing a first cache eviction policy;
    in response to the cache size being greater than the extended cache size limit, implementing a second cache eviction policy that is stricter than the first cache eviction policy;
    wherein in response to the cache size being between the primary cache size limit and the extended cache size limit, permitting simultaneous GET and PUT operations; and
    in response to the cache size being greater than the extended cache size limit, permitting concurrent GET operations.

2. The method of claim 1, wherein the first cache eviction policy has a first pruning percentage for evicting cache entries.

3. The method of claim 2 comprising identifying cache entries with a last access falling below the first pruning percentage.

4. The method of claim 2, wherein the second cache eviction policy has a second pruning percentage for evicting cache entries, the second pruning percentage being greater than the first pruning percentage.

5. The method of claim 4, comprising identifying cache entries with a last access falling below the second pruning percentage.

6. The method of claim 1, further comprising monitoring a cache miss ratio and in response adjusting the primary cache size limit and the extended cache size limit.

7. The method of claim 6, wherein if the response to the cache miss ratio being below a pre-selected threshold cache miss ratio threshold value, adjusting down the primary cache size limit and the extended cache size limit.

8. The method of claim 7, wherein the primary cache size limit and the extended cache size limit are adjusted down by a step value.

9. The method of claim 6, wherein if the response to the cache miss ratio being above a pre-selected cache miss ratio threshold value, adjusting up the primary cache size limit and the extended cache size limit.

10. The method of claim 9, wherein the extended cache size limit and the primary cache size limit are adjusted up by a step value.

11. A method, comprising:
performing caching, using a cloud-based cache in a concurrent memory access environment for an application having bursty concurrent transactions from multiple threads;
managing the cloud-based cache to avoid out of memory overloads via a cache management system having a primary cache size limit and an extended cache size limit, wherein the extended cache size limit is greater than the primary cache size limit;
in response to a cache size being between the primary cache size limit and the extended cache size limit, implementing a first cache eviction policy; and
in response to the cache size being greater than the extended cache size limit, implementing a second cache eviction policy that is stricter than the first cache eviction policy;
in response to the cache size being between the primary cache size limit and the extended cache size limit, permitting simultaneous GET and PUT operations;
in response to the cache size being greater than the extended cache size limit, permitting concurrent GET operations; and
wherein the primary cache size limit and the extended cache size limit are adjustable based on monitored cache miss heuristics; wherein if a cache miss ratio is below a preselected threshold value, the primary cache size limit and the extended cache size limit are adjusted down and wherein if the cache miss ratio is above the pre-selected threshold value, increasing the primary cache size limit and the extended cache size limit.

12. The method of claim 11, further comprising customizing the pre-selected threshold value of the cache miss ratio based on application-specific traffic patterns.

13. The method of claim 11, wherein the first cache eviction policy has a first pruning percentage for evicting cache entries and the second cache eviction policy has a second pruning percentage for evicting cache entries, the second pruning percentage being greater than the first pruning percentage.

14. A method, comprising:
performing caching, using a cloud-based cache concurrent environment based on a concurrent map for an application having bursty concurrent transactions from multiple threads;
managing the cloud-based cache to avoid out of memory issues via a cache management system having a primary cache size limit and an extended cache size limit, wherein the extended cache size limit is greater than the primary cache size limit;
in response to a cache size being between the primary cache size limit and the extended cache size limit, implementing a first cache eviction policy and enacting a first policy for permitting GET and PUT operations;
in response to the cache size being greater than the extended cache size limit, a stricter second cache eviction policy and enacting a stricter second policy for permitting GET and PUT operations; and
the primary cache size limit and the extended cache size limit being adjustable based on monitored cache miss heuristics; wherein if a cache miss ratio is below a preselected threshold value, the primary cache size limit and the extended cache size limit are adjusted down and wherein if the cache miss ratio is above the pre-selected threshold value, increasing the primary cache size limit and the extended cache size limit.

15. The method of claim 14, further comprising customizing the preselected threshold value of the cache miss ratio threshold based on application-specific traffic patterns.

* * * * *